United States Patent [19]

Mueller

[11] 4,408,694
[45] Oct. 11, 1983

[54] REINFORCED PLASTIC HOME CANNING RING

[75] Inventor: Bruce Mueller, Sylvania, Ohio

[73] Assignee: Owens-Illinois, Inc., Toledo, Ohio

[21] Appl. No.: 267,965

[22] Filed: May 28, 1981

[51] Int. Cl.³ .............................................. B65D 45/30
[52] U.S. Cl. .................................................. 215/276
[58] Field of Search ......................... 215/276; 264/108

[56] References Cited

U.S. PATENT DOCUMENTS

| | | | |
|---|---|---|---|
| 2,999,275 | 9/1961 | Blume | 264/108 X |
| 3,263,274 | 8/1966 | Pickels | 264/108 X |
| 3,404,203 | 10/1968 | Donald | 264/108 |
| 3,432,295 | 3/1969 | Frank et al. | 264/108 X |
| 4,093,094 | 6/1978 | Smalley et al. | 215/276 |

*Primary Examiner*—Donald F. Norton
*Attorney, Agent, or Firm*—J. R. Nelson; M. E. Click; D. H. Wilson

[57] ABSTRACT

A dimensionally stable plastic canning ring for securing vacuum sealing lids to food containers during processing, is fabricated of thermoplastic material reinforced with fibers. The fibers are circumferentially aligned in the plastic media whereby the canning ring exhibits thermal expansion which is lowest in the direction of fiber alignment, i.e., circumferentially. The circumferential thermal coefficient of expansion substantially matches that of a glass container with which the canning ring is utilized. Due to the similarity of thermal coefficients of expansion, relative dimensional differences between the plastic ring and the glass container occurring during processing are negligible. The ring is manufactured by an injection molding process. The mold cavity includes a single gate disposed generally adjacent its periphery. Injection of the plastic and fiber material into the mold through the single gate causes laminar circumferential flow about the mold cavity and alignment of the fibers with the circumferential flow streamlines.

2 Claims, 5 Drawing Figures

REINFORCED PLASTIC HOME CANNING RING

BACKGROUND OF THE INVENTION

The invention relates to injection molded articles and more specifically to closure rings fabricated of fiber-filled plastic which exhibit a coefficient of expansion that, circumferentially, is substantially equal to that of glass.

The components utilized for home preservation of fruit and vegetables have undergone remarkably little change in decades. A metallic lid with a resilient elastomer gasket, a threaded retaining ring and a complementarily threaded glass container typically constitute these components. The popularity of this food preservation system is matched by its routinely high success rate. The food storage scheme is not without problems, however, and they typically relate to the retaining ring and its removal.

Typical prior art canning rings are fabricated of steel or other suitable metal and are subject to corrosion and rusting. This problem may be compounded in several ways. First of all, the metal ring may be exposed to especially corrosive vapors emitted from the container during processing. Numerous small corrosion sites may thus be formed when the ring is first used. Secondly, processed and sealed containers are typically stored in basements and other areas of relatively high humidity. Deterioration, once begun, is typically exacerbated under these storage conditions. Finally, the containers may be stored for extended periods of time, often for as long as several years. During this time, corrosion may render the metal ring and regions of the glass container and lid in contact with it aesthetically unappealing.

Deterioration of the metal is not solely a cosmetic problem, however. Such corrosion may render removal of the ring difficult or even dangerous inasmuch as extended storage may tightly fix the ring to the glass container. The user may then resort to hand tools and other mechanical devices which are not suited for such tasks in an attempt to remove the ring.

One solution to this problem has been the removal of the metal canning ring subsequent to processing and cooling. This solution obviously alleviates corrosion and removal problems but results in increased vulnerability of the sealed containers to accidental loss of seal and subsequent content spoilage.

Another approach has been the utilization of canning rings fabricated of various plastics. Plastic rings enjoy exceptional freedom from rusting, corrosion and attack by various foods. Such rings, however, exhibit mechanical characteristics which seriously limit their use. Generally, suitable polymeric resins have a substantially higher thermal coefficient of expansion than does the glass from which conventional canning containers are fabricated. The rings, therefore, expand at a greater rate than the container finish to which they are threadably secured. Given the approximately 170° F. temperature difference from ambient temperature to processing temperature to which the rings and containers are subjected, the disparity between the thermal expansion rates of the plastic and glass cause the canning ring to loosen and even dislodge from the container finish. In the first instance, the previously properly applied torque is lost and in the latter, the container contents are either partially harmed or completely destroyed.

SUMMARY OF THE INVENTION

The instant invention comprehends a dimensionally stable plastic canning ring fabricated of a polymeric resin such as polypropylene which includes 30% by weight glass fibers having a length of between 0.125 inches and 0.25 inches. The fibers are tangentially aligned (i.e., generally parallel with the peripheral or circumferential surface) such that the thermal coefficients of expansion along radial, axial, and circumferentially axes are anisotropic. Specifically, the tangential or circumferential coefficient of expansion is substantially less than that in the other two directions as a result of the chain-like axial overlapping or linking of the fibers. The stated weight percentage of glass fibers in polypropylene as well as various other plastic materials and fillers, more specifically set forth below, result in canning rings having a circumferential thermal coefficient of expansion which is negligibly different from that of a glass container. As the container and ring are temperature cycled during processing, little dimensional disparity, specifically diametral disparity, develops between the glass container finish and the canning ring and the ring stays properly seated upon the glass container finish.

Preferably, the ring is fabricatd by substantially conventional injection molding techniques. Glass fiber reinforced polymeric resins of the appropriate composition may be utilized in a standard injection molding machine. The mold itself, however, is unique in that it includes a single gate through which the molten resin enters the mold. The gate is disposed on the periphery of the mold cavity such that the resin flows generally along laminar streamlines in opposite directions around the mold, the two resin flows meeting at a site approximately diametrically opposite the single gate. The fibers are aligned with the direction flow in the gate and remain substantially parallel with the flow streamlines in the mold. The circumferential or tangential orientation of the majority of fibers results in the ring exhibiting a substantially reduced circumferential thermal coefficient of expansion.

Thus, it is an object of the instant invention to produce a plastic article which has a thermal coefficient of expansion in at least one direction which approximates that of glass.

It is a further object of the instant invention to provide a plastic ring fabricated of polymeric resin and fiber filler having a circumferential thermal coefficient of expansion which is substantially below that measured in axial (height) and radial (thickness) directions.

It is a still further object of the instant invention to provide a plastic canning ring which substantially maintains application torque during processing steps.

It is a still further object of the instant invention to provide a plastic canning ring which eliminates corrosion and rusting as well as problems associated with the removal of such corroded and rusted metal canning rings.

Additional objects and advantages of the instant invention will become apparent by reference to the following specification and appended drawings.

DESCRIPTION OF THE PREFERRED EMBODIMENT

Figure 1:
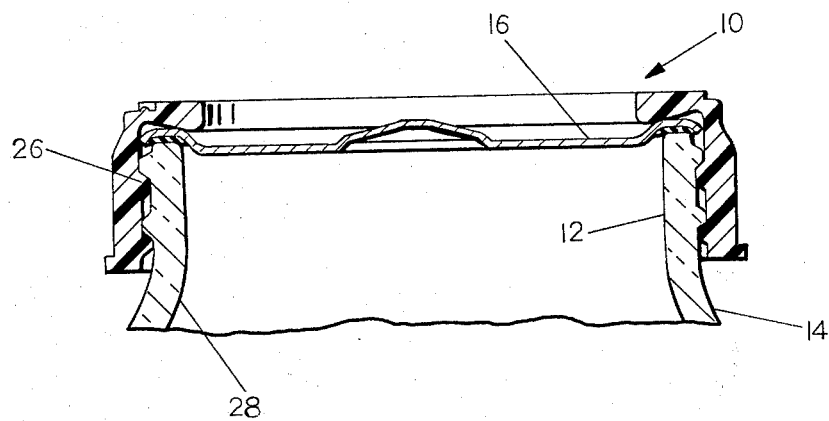
FIG. 1 is a fragmentary full sectional side view of a dimensionally stable plastic canning ring according to the instant invention in place upon a sealing lid and glass container.
Figure 2:
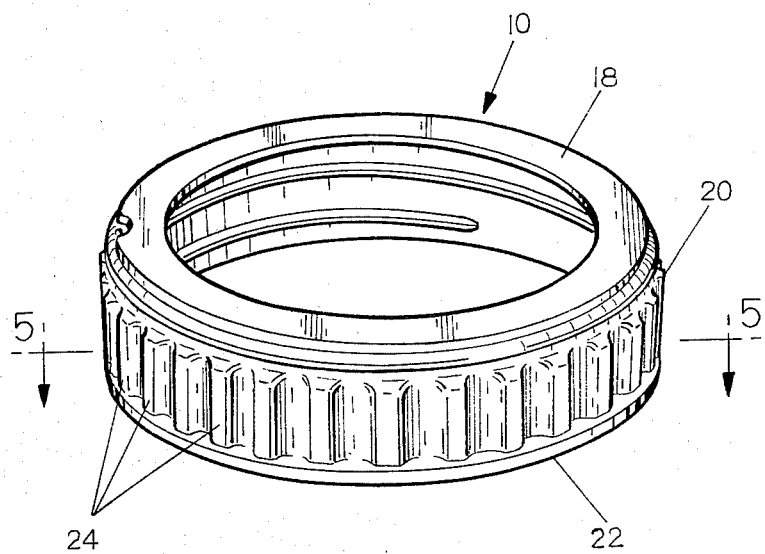
FIG. 2 is a perspective view of a plastic canning ring according to the instant invention.

Referring now to FIGS. 1 and 2, a dimensionally stable plastic ring according to the instant invention is generally designated by the reference numeral 10. In FIG. 1, the plastic ring 10 is shown in position on the finish 12 of a glass canning container 14. The ring 10, as is well known, is utilized to retain a vacuum sealing lid 16 over the mouth of the container 14 during processing of the food within the container 14 at elevated temperatures. The plastic ring 10 comprises an annular top or panel region 18, a sidewall 20 and a skirt 22. A plurality of parallel, spaced-apart flutes 24 extend about the circumference of the canning ring 10 on the outer surface of the sidewall 18. The flutes 24 aid tight and comfortable purchase of the ring 10 by a user when securing or removing it from a container 14. Threads 26, preferably having a Buttress profile are disposed on the inner surface of the sidewall 20 in a configuration complementary to threads 28 disposed on the outer surface of the finish 12.

Figure 3:
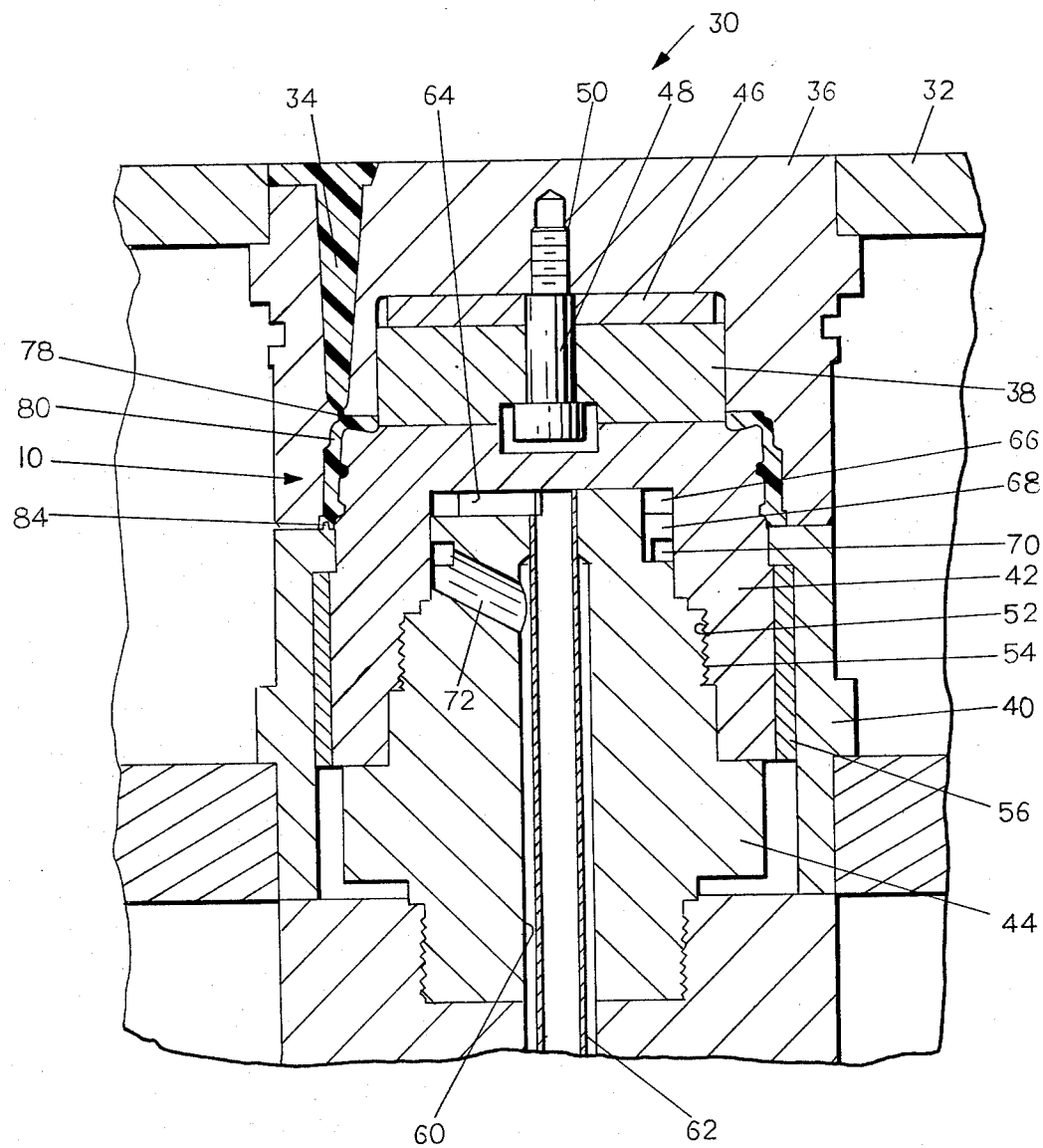
FIG. 3 is a fragmentary full sectional view of mold components utilized to fabricate a plastic canning ring according to the instant invention illustrating the single sprue and mold gates.

Referring now to FIG. 3, a mold assembly 30 which may be utilized to fabricate the plastic ring 10 according to the instant invention is illustrated. The mold assembly 30 is received and positioned within suitable cavities within a conventional injection molding machine 32. The injection molding machine 32 is preferably of the screw rather than the plunger type, although either can be utilized to practice the instant invention. According to conventional practice, the injection molding machine 32 will include a plurality of mold assemblies 30 which are supplied molding media. A centrally disposed runner (not illustrated) communicates with and distribute media to a sprue 34 associated with each of the mold assemblies 30. Inasmuch as other details of the injection molding machine 32 are deemed to be conventional and well known in the art, they will not be further described. The mold assembly 30 comprises an upper cavity mold piece 36, an upper cavity core 38, a lower cavity sleeve 40, a lower outer core 42, and a lower inner core 44. The upper cavity core 38 is maintained in proper axial position by a spacer or shim 46 and the upper cavity core 38 and the shim 46 are both secured to the upper cavity mold piece 36 by a suitable threaded fastener 48 disposed in the threaded, blind opening 50.

The lower outer core 42 and the lower inner core 44 of the mold assembly 30 are secured together by complementary female threads 52 and male threads 54 disposed on opposed, axially aligned surfaces of the outer core 42 and the inner core 44, respectively. The inner core 44 defines an axial passageway 60 within which is disposed a coaxial tube 62. The upper end of the tube 62 is in communication with a radial passageway 64. The radial passageway 64 intersects and communicates with a first annular passageway 66. Diametrically opposed from the radial passageway 64 is an axial passageway 68 which communicates between the first annular passageway and a second annular passageway 70. An oblique passageway 72, which is disposed generally radially relative to the axial passageway 60, communicates between the second annular passageway 70 and the axial passageway 60. The foregoing configuration of annular and radial passageways provides a circuit through which fluid cooling media may pass to remove heat from the mold assembly 30, specifically, the lower outer core 42. A friction reducing sleeve 56 is disposed between the lower cavity sleeve 40 and the lower outer core 42 to permit relative rotation between these two components in order to assist removal of the canning ring 10 from the mold assembly 30 in a manner to be more fully described subsequently.

Figure 5:
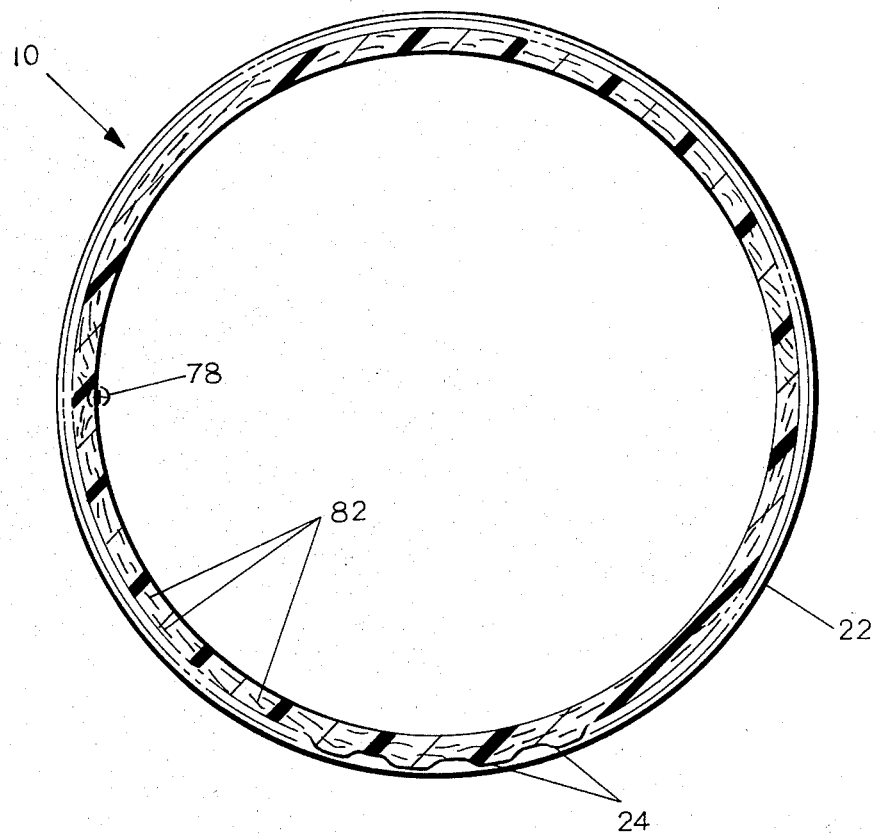
FIG. 5 is a full sectional plan view of a plastic canning ring according to the instant invention taken along line 5—5 of FIG. 2 which illustrates diagrammatically the orientation of fibers within the resin.
Figure 4:
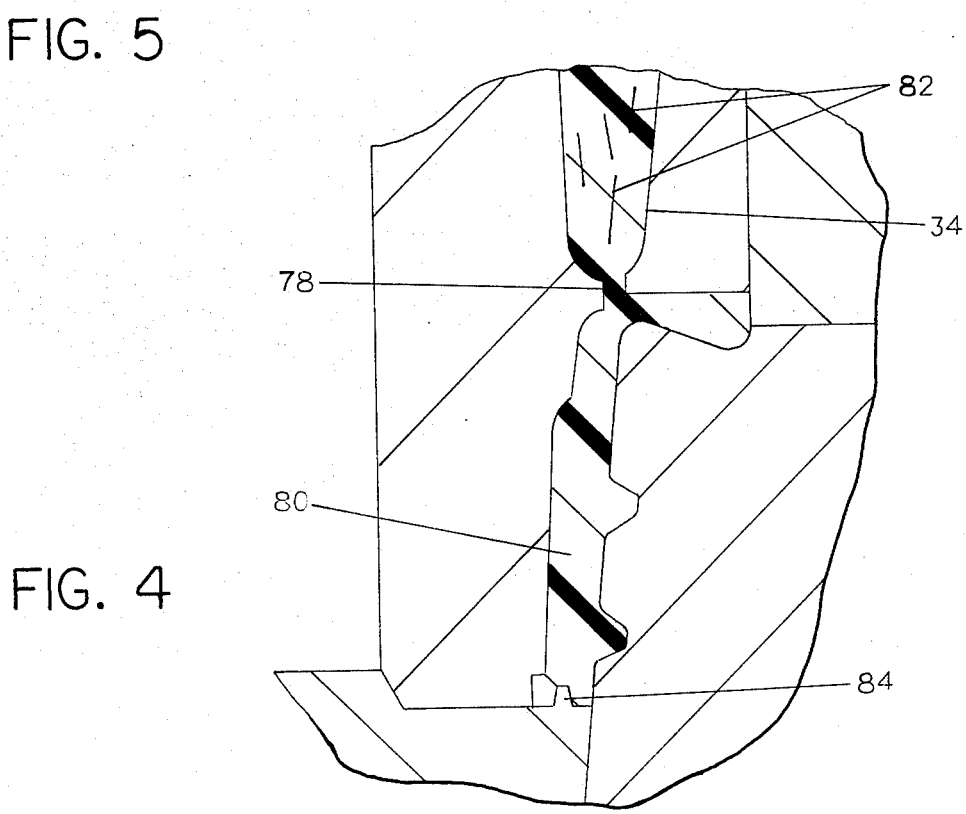
FIG. 4 is an enlarged fragmentary sectional view of the single sprue and gate of a mold utilized to fabricate the instant invention.

Referring now to FIGS. 4 and 5, each mold assembly 30 includes the single sprue 34 as previously noted. The sprue 34 tapers to a gate 78 which communicates between the sprue 34 and a mold cavity 80. For reasons which will be more fully explained subsequently, the diameter of the gate 78 relative to the average size of a reinforcing fiber 82 is significant and is preferably less than the length of said fibers. For example, it has been found that a gate diameter approximately one-fourth the length of the reinforcing fibers 82 is desirable. For example, for use with reinforcing fibers 82 having an average approximate length of 0.125 inches, a gate diameter in the range of 0.030 inches to 0.040 inches is preferable. FIG. 4 also illustrates one of a plurality of removal lugs 84. The removal lugs 84 generally extend upwardly into the mold cavity 80 from the lower cavity sleeve 40 and define a concentric circle therein. The removal lugs 84 have a generally saw-tooth profile which engage the canning ring 10 and assists its removal from the lower outer core 42 in a manner to be more fully described directly below.

Referring now to FIGS. 3, 4, and 5, manufacture of a dimensionally stable plastic ring 10 according to the instant invention will be described. At the outset, it should be understood that a broad variety of thermoplastic materials may be utilized to fabricate the plastic ring 10. For example, homopolymers of polypropylene, various modified polypropylenes such as ethylene propylene, butylene propylene, ethylene, stryrenebutadiene as well as polyethylene and polystrene may be utilized. These thermoplastic materials will preferably exhibit a melt temperature in the region of 190° C. in accordance with conventional injection molding machine practice. With regard to the reinforcing fibers 82, it has been found that glass fibers having a diameter in the range of 12 to 14 microns and a length of approximately 0.125 to 0.25 inches are preferable from both performance and economic standpoints. These fibers are added to the plastic media such that the final mix is preferably 70% thermoplastic media and 30% glass fibers by weight. Such glass fiber reinforced plastics are known in the art and are typically supplied in bulk in $\frac{1}{8}$ inch to $\frac{1}{4}$ inch diameter pellets which assists and simplifies handling and transfer of the material. This glass fiber reinforced thermoplastic material is melted and supplied through the runners, the sprues 34, the gates 78, and then into the mold cavities 80. As noted above, the diameter of the gate 78 is relatively small, being in the range of from 0.030 inches to 0.040 inches when reinforcing fibers 82 of approximately 0.125 inches in length are utilized. It is believed that such a diameter to length ratio assists and is primarily responsible for the orientation of the glass fibers within the thermoplastic material as they enter the mold cavity 80. As the material enters the mold cavity 80, the flow is generally laminar in opposite directions about the mold cavity 80. The mold cavity 80 is filled and the flow of thermoplastic material is terminated.

As previously noted, the surfaces of the mold cavity 80, particularly those defined by the lower outer core 42, are cooled by the passage of fluid through the various passageways defined in the head of the lower inner core 44. Upon completion of the mold cycle and cooling of the ring 10 within the mold cavity 80, the mold separates along the plane generally defined by the lower surface of the upper cavity core 38 and the upper surface of the lower outer core 42. The completed plastic ring 10 must then be removed from the lower outer core 42. The ring 10 is restrained against rotation by the removal lugs 84 disposed on the upper surface of the lower cavity sleeve 40. The lower inner and outer cores 42 and 44, respectively, may be rotated relative to the sleeve 40 and the plastic ring 10 restrained thereon to effect its removal therefrom and the release of the ring 10. The components of the mold assembly 30 are then returned to the positions illustrated in FIG. 3 and the injection molding cycle is repeated.

As diagrammatically illustrated in FIG. 5, the reinforcing fibers 82, represented by thin short lines, are oriented by and parallel with the flow streamlines of the plastic resin as it is injected into the mold cavity 80. The axially overlapping arrangement of reinforcing fibers 82 oriented generally tangentially about the plastic ring 10 is achieved by the utilization of a single sprue 78 on each mold cavity 80. In areas both directly adjacent the sprue 78 and diametrically opposite thereto, it should be understood that the reinforcing fibers 82 will be in a somewhat random orientation, again resulting from the flow pattern of the plastic resin as it is injected into the mold cavity 80. Inasmuch as the areas of random fiber orientation are small in comparison to those areas having circumferential fiber orientation, they have a negligible effect on the overall performance of the canning ring 10. It should be noted that only a small percent of the reinforcing fibers 82 are illustrated in FIG. 5.

As an example of the instant invention, a dimensionally stable plastic ring 10 was fabricated in accordance with the above procedure. The ring 10 was polypropylene and included glass reinforcing fibers 82 oriented within the polypropylene in an overlapping substantially tangential arrangement as illustrated in FIG. 5. When secured to a glass container 14 and subjected to water bath processing having a starting temperature of 70° F. and a maximum temperature of 240° F. (i.e., a 170° temperature difference) the ring 10 was observed to enlarge about 0.008 inches in diameter. Subjected to the same temperature change the diameter of a glass container will typically enlarge about 0.002 inches. This diametral expansion difference is insufficient to cause loosening of rings on containers and has been found to minimize food processing failures by maintaining proper ring and lid tightness throughout the entire heating and cooling cycle. By way of contrast, a prior art homopolymer polypropylene canning ring has been observed to expand as much as 0.027 inches or more during the same 170° F. temperature excursion, causing loosening of the ring and loss of proper seal during the processing cycle.

The foregoing disclosure is the best mode devised by the inventor for practicing this invention. It is apparent, however, that devices incorporating modifications and variations will be obvious to one skilled in the art of plastic closures. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. A plastic device for securing a lid to a mouth defining portion of a threaded glass container, said device defining an annulus molded of polypropylene material having glass reinforcing fibers disposed therein, said annulus having an inner surface, thread means defined on said inner surface for engaging the threaded portion of said container, and an outer surface, said annulus defining a reference circle disposed therein medially between said inner and outer surfaces thereof, and said reinforcing fibers disposed in generally aligned, overlapped relationship along axes generally parallel to said reference circle of said annulus in two diametrically opposed substantially semicircular regions and said fibers being in random orientation in two diametrically opposed regions between said semicircular regions, said glass fibers having a diameter in the range of 12 to 14 microns and average in length between about 0.075 and 0.300 inches, said fibers, constituting about 30% by weight of said device, the outer surface of said annulus being provided with a plurality of spaced-apart axial flutes.

2. The plastic device of claim 1 wherein said glass fibers have an average length of about 0.125 inches.

* * * * *